United States Patent
Verhagen et al.

(10) Patent No.: US 9,239,102 B2
(45) Date of Patent: Jan. 19, 2016

(54) METHOD FOR PRODUCING A SPINDLE FOR A SPINDLE DRIVE, A ROLLER SCREW DRIVE COMPRISING SUCH A SPINDLE AND USE OF SAID ROLLER SCREW DRIVE

(75) Inventors: Armin Verhagen, Schwieberdingen (DE); Willi Nagel, Remseck/Hochdorf (DE); Bernd Goetzelmann, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 471 days.

(21) Appl. No.: 13/502,597

(22) PCT Filed: Sep. 6, 2010

(86) PCT No.: PCT/EP2010/063029
§ 371 (c)(1),
(2), (4) Date: Apr. 18, 2012

(87) PCT Pub. No.: WO2011/047921
PCT Pub. Date: Apr. 28, 2011

(65) Prior Publication Data
US 2012/0200009 A1    Aug. 9, 2012

(30) Foreign Application Priority Data

Oct. 20, 2009  (DE) .................. 10 2009 045 857

(51) Int. Cl.
*F16H 25/22*  (2006.01)
*F16H 25/24*  (2006.01)
(Continued)

(52) U.S. Cl.
CPC .............. *F16H 25/22* (2013.01); *B21D 15/10* (2013.01); *B62D 5/0445* (2013.01); *B62D 5/0451* (2013.01); *F16H 25/2247* (2013.01);
(Continued)

(58) Field of Classification Search
CPC ..... F16H 25/22; F16H 25/2247; F16H 25/24; B62D 5/0445; B62D 5/0448; B62D 5/0451
USPC ............... 180/443, 444, 446; 188/8, 72, 156; 303/15; 74/424.71, 424.81, 841, 89.23
See application file for complete search history.

(56) References Cited

U.S. PATENT DOCUMENTS 2,490,513 A   12/1949   Dreyer
2,743,759 A    5/1956   Snow et al.
(Continued)

FOREIGN PATENT DOCUMENTS

CN        203258202     * 10/2013
DE          2032160     *  1/1972  .............. F16C 17/16
(Continued)

OTHER PUBLICATIONS

International Search Report corresponding to PCT Application No. PCT/EP2010/063029, mailed Jan. 21, 2011, (German and English language document) (7 pages).

*Primary Examiner* — Joseph Rocca
*Assistant Examiner* — Maurice Williams
(74) *Attorney, Agent, or Firm* — Maginot, Moore & Beck LLP

(57) ABSTRACT

The disclosure relates to a threaded shaft for a roller screw drive, for example for an electromechanical brake booster or an electromechanical power steering system. According to the disclosure, a helical coil with a flat, square-threaded annular cross-section is arranged on a thin-walled pipe, the pipe being formed onto a root region of the helical coil by the application of high pressure from the inside of the pipe.

9 Claims, 4 Drawing Sheets

(51) Int. Cl.
 *B21D 15/10* (2006.01)
 *B62D 5/04* (2006.01)
 *B21D 39/00* (2006.01)

(52) U.S. Cl.
 CPC ............... *F16H25/24* (2013.01); *B21D 39/00* (2013.01); *F16H 25/2261* (2013.01); *Y10T 74/19744* (2015.01)

(56) References Cited

U.S. PATENT DOCUMENTS

| | | | |
|---|---|---|---|
| 2,766,806 | A | 10/1956 | Rothermel et al. |
| 3,168,604 | A | 2/1965 | Kramer et al. |
| 3,669,586 | A | 6/1972 | Kramer |
| 4,364,252 | A | 12/1982 | Koizumi |
| 4,572,314 | A * | 2/1986 | Anguera ................ 180/444 |
| 5,040,631 | A * | 8/1991 | Lang et al. .............. 180/446 |
| 5,127,285 | A * | 7/1992 | Granhom ................ 74/527 |
| 5,299,649 | A * | 4/1994 | Sano et al. .............. 180/400 |
| 5,435,962 | A | 7/1995 | Kramer, Jr. |
| 6,305,508 | B1 | 10/2001 | Schumann |
| 6,497,030 | B1 * | 12/2002 | Marando ................ 29/421.1 |
| 6,554,109 | B1 * | 4/2003 | Olschewski et al. .......... 188/72.8 |
| 6,568,715 | B2 * | 5/2003 | Cwik ................ 285/301 |
| 6,685,382 | B2 * | 2/2004 | Capewell et al. ............ 403/343 |
| 7,240,764 | B2 * | 7/2007 | Perni et al. .............. 180/444 |
| 7,353,723 | B2 * | 4/2008 | Lardy et al. .............. 74/89.23 |
| 7,954,827 | B2 * | 6/2011 | Maruyama et al. ......... 280/5.522 |
| 8,479,605 | B2 * | 7/2013 | Shavrnoch et al. ........ 74/388 PS |
| 2001/0029797 | A1 * | 10/2001 | Lange et al. ................ 74/89.37 |
| 2002/0063014 | A1 * | 5/2002 | Yoshida et al. .............. 180/444 |
| 2002/0096388 | A1 * | 7/2002 | Fujiwara et al. .............. 180/444 |
| 2002/0144560 | A1 * | 10/2002 | Yatsushiro et al. ........... 74/89.4 |
| 2003/0029258 | A1 * | 2/2003 | Davies et al. .............. 74/89.26 |
| 2003/0084736 | A1 * | 5/2003 | Darby .................. 74/89.23 |
| 2003/0146038 | A1 * | 8/2003 | Mills et al. .............. 180/422 |
| 2004/0069559 | A1 * | 4/2004 | Iwasa et al. .............. 180/443 |
| 2006/0060014 | A1 * | 3/2006 | Namgung ............... 74/89.23 |
| 2007/0212220 | A1 * | 9/2007 | Perkinson et al. ............. 416/46 |
| 2009/0251258 | A1 * | 10/2009 | Rhinefrank et al. ......... 335/306 |
| 2009/0255752 | A1 * | 10/2009 | Asakura et al. ............. 180/444 |
| 2009/0308192 | A1 * | 12/2009 | Lin et al. ................ 74/424.81 |
| 2011/0000737 | A1 * | 1/2011 | Nagase et al. .............. 180/444 |

FOREIGN PATENT DOCUMENTS

| | | | | |
|---|---|---|---|---|
| DE | 3731281 | * | 4/1988 | .............. F16H 25/20 |
| DE | 102005007271 | A1 * | 9/2005 | .............. F16H 25/24 |
| DE | 102012012656 | * | 12/2013 | .............. H02K 7/12 |
| EP | 0301779 | * | 2/1989 | .............. B23Q 5/40 |
| JP | 5-57380 | A | 3/1993 | |
| JP | 2002-257485 | A | 9/2002 | |

\* cited by examiner

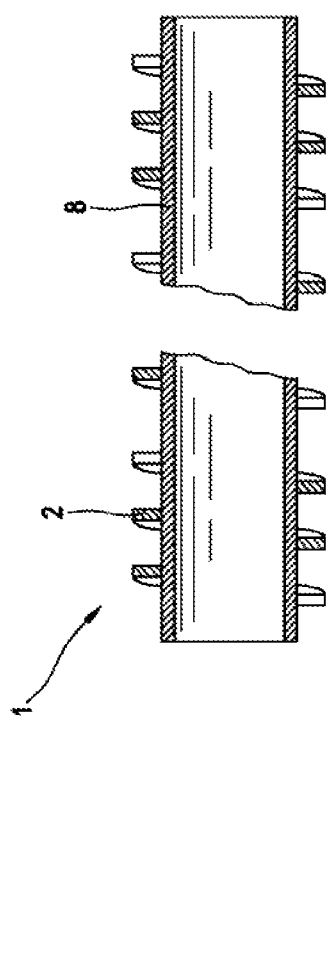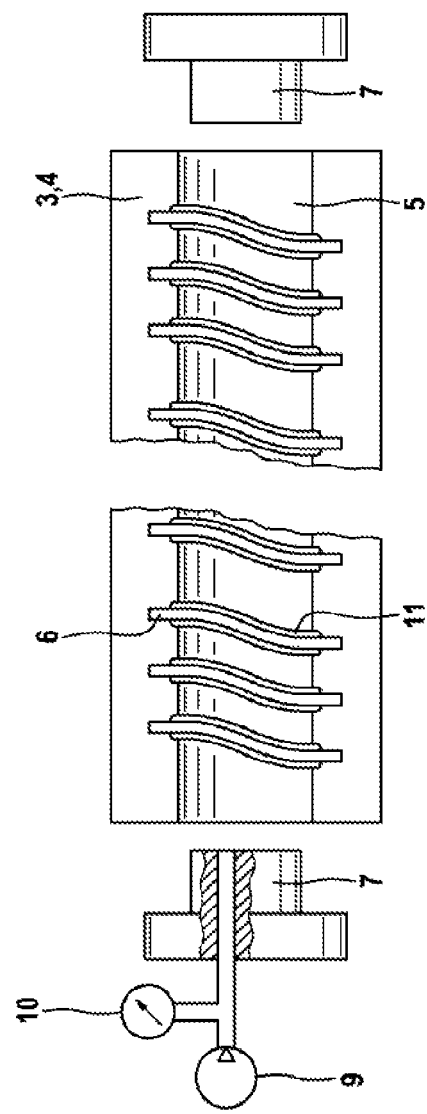

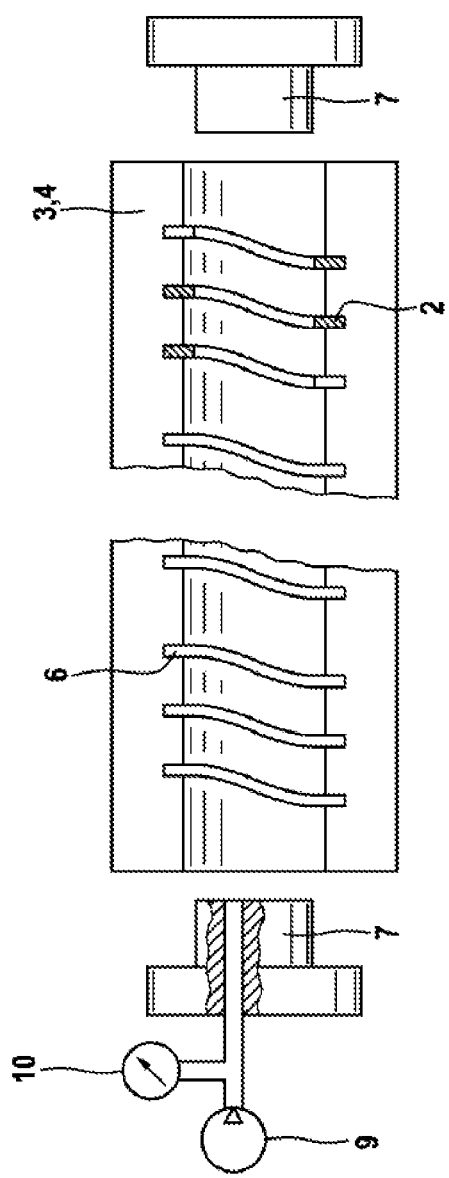
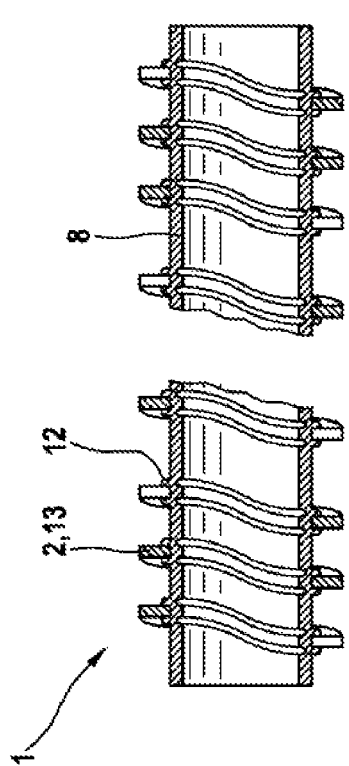

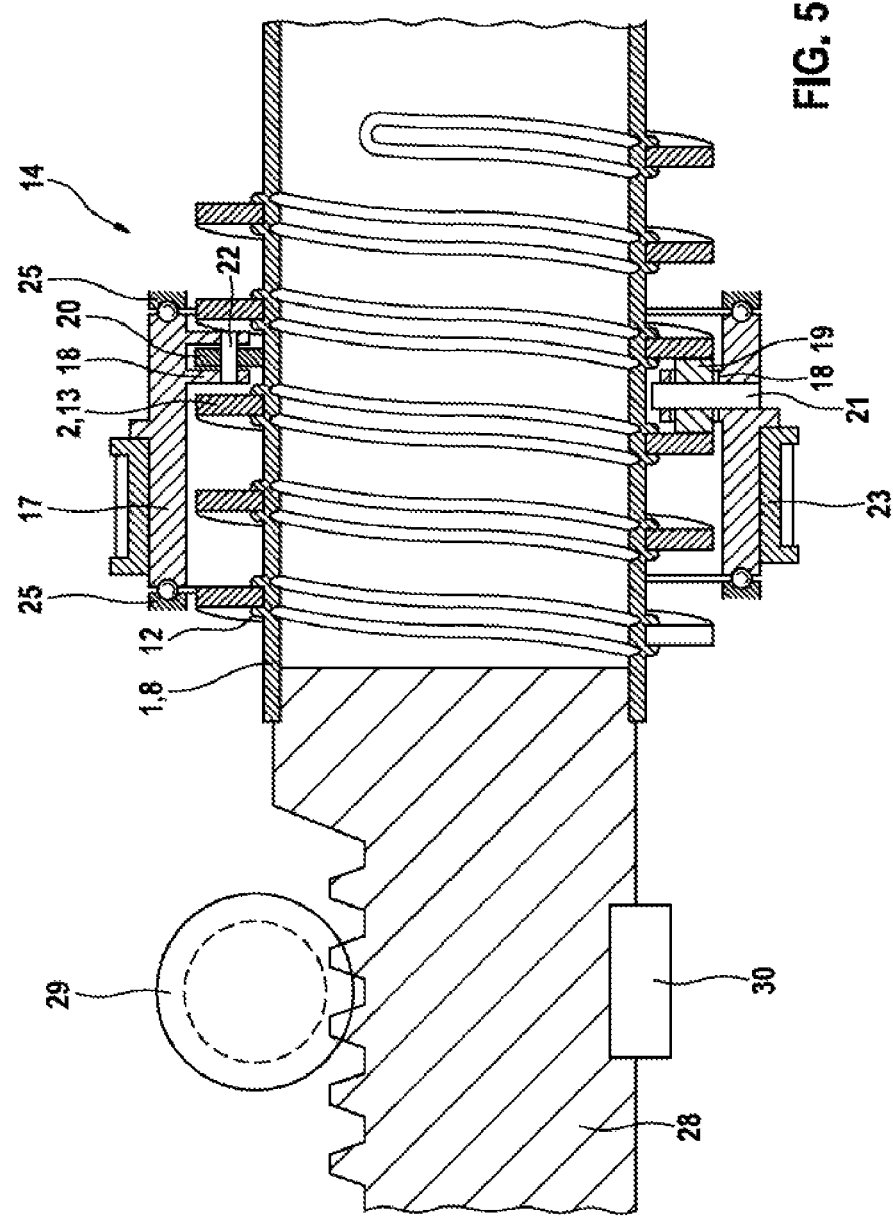

METHOD FOR PRODUCING A SPINDLE FOR A SPINDLE DRIVE, A ROLLER SCREW DRIVE COMPRISING SUCH A SPINDLE AND USE OF SAID ROLLER SCREW DRIVE

This application is a 35 U.S.C. §371 National Stage Application of PCT/EP2010/063029, filed on Sep. 6, 2010, which claims the benefit of priority to Serial No. DE 10 2009 045 857.3, filed on Oct. 20, 2009 in Germany, the disclosures of which are incorporated herein by reference in their entirety.

The disclosure relates to a method for producing a spindle for a spindle drive and also to a roller screw drive comprising such a spindle and to the use of the roller screw drive in an electromechanical brake booster and an electromechanical power steering system.

BACKGROUND

Spindle drives are known. They belong to the helical gear mechanisms and convert a rotary drive movement into a translatory drive output movement, occasionally also vice versa, where in the latter case the spindle drive does not have to be of self-locking design. A spindle nut can be driven in rotation and a spindle can be displaced axially, or vice versa. In this case, the spindle nut is to be defined on the basis of its function, which is that of converting a rotary movement into a translatory movement, or vice versa, together with the spindle; the appearance of said spindle nut does not necessarily have to be reminiscent of a nut. A distinction is made between lead screw drives and roller screw drives, with the latter including inter alia ball-screw drives, in many cases with ball circulation, i.e. ball return in the spindle nut. The spindle produced according to the disclosure is intended in particular for a roller screw drive, although this is not compulsory; it can also be used in a lead screw drive.

The spindle is normally produced by cutting by turning, thread whirling or grinding or by deforming by rolling. To increase the resistance to wear, the thread can then be hardened and/or ground to increase the accuracy.

SUMMARY

The method according to the disclosure provides for the production of a spindle for a spindle drive from a tube and one or more coils. The coil later forms a thread of the spindle and has the cross section thereof. The coil is applied to the tube or the tube is introduced into the coil and the tube is pressurized from the inside, such that it plastically deforms and rests against or is integrally formed on the coil in the root region. The pressure is applied in particular hydraulically; the method can be referred to as hydroforming. In the root region of the coil, i.e. at the transition from the coil to the tube, the tube can be integrally formed, on both sides of turns of the coil, somewhat outward on the turns, or the coil can be formed into the tube somewhat, such that a positive lock is formed between the coil and the tube and holds the coil in the axial direction on the tube. The coil is held on the tube by positive locking and/or by a force fit. An integral bond can also be formed by cold welding.

With the method according to the disclosure, it is possible to produce a thin-walled hollow spindle; the method according to the disclosure allows for a light spindle to be produced with little use of material. A further advantage of the disclosure is orthogonal loading of the coil, which forms the thread of the spindle, in a spindle drive, when the coil has a rectangular cross section. Apart from a constant pitch, the disclosure also allows for a pitch which varies over the length of the spindle.

The tube and the coil are introduced into a mold and the mold is closed, before the tube is pressurized from the inside and is thereby integrally formed on the root region of the coil plastically from the inside. The order in which the tube passes into the coil, the coil passes into the mold and the tube passes into the mold is not important. It is essential that the tube is located in the mold with the coil surrounding it like a thread. The mold is reminiscent of an injection mold or a die-casting mold. A cavity of the mold has the negative form of the spindle to be produced, the mold positions the coil on the tube or holds the coil positioned on the tube and supports the coil and/or the tube from the outside counter to the pressurization of the tube from the inside. Once the mold has been closed, the tube is pressurized from the inside, such that it plastically deforms and rests against or is integrally formed on the coil in the root region. In the root region of the coil, i.e. at the transition from the coil to the tube, the cavity can have a bevel or rounded-off portion into which the tube is deformed, such that helically circumferential beads are formed on the tube in the root region of the coil and hold the coil in the axial direction on the tube. The coil is held on the tube by positive locking and/or by a force fit. An integral bond can also be formed by cold welding.

The disclosure provides for a plurality of coils to be arranged on the tube. This configuration of the disclosure makes it possible to produce a plurality of spindles by separating the tube with the applied coils into a plurality of spindles following removal from the mold. A plurality of coils applied to the tube such that they engage axially into one another make it possible to produce a spindle having a multi-turn thread.

To increase the resistance to wear, the disclosure provides a coil of hardened steel. To increase the dimensional accuracy, the coil can be ground after the spindle has been produced, it being sufficient to grind the coil surface(s) which form(s) a/the thread flank(s).

With a modification of the method according to the disclosure, it is possible to produce a spindle with an inner thread. To this end, the coil is arranged on a core which supports it during the hydroforming from the inside, and the tube is arranged on the coil on the outside, it also being possible for the order to be reversed. Then, the tube is pressurized from the outside and, as described per se, is integrally formed from the outside on the coil, such that the coil is held fixed axially and against rotation in the tube.

The disclosure further relates to a roller screw drive comprising a spindle which is produced by the method explained above. The roller screw drive has a drive roller which rolls on the coil. If the coil has a rectangular cross section and consequently the spindle has a rectangular thread cross section, the drive roller is in particular cylindrical and has an axle radially in relation to the spindle. If the coil has a trapezoidal cross section and consequently the thread is trapezoidal, the drive roller can be in the form of a conical roller and/or the axle thereof can be arranged at an angle to the radial in relation to the spindle. The drive roller, which rolls on the coil which forms the thread of the spindle, forms as it were a spindle nut or is part of a spindle nut. Rotation of the spindle displaces the drive roller in an axially parallel direction in relation to the spindle. It is preferable for two, three or more drive rollers to be arranged distributed around the spindle, in which case the drive rollers are arranged offset in relation to one another according to the pitch of the coil, which at the same time is the pitch of the thread of the spindle, or the spindle has a number of turns. The drive rollers can be rotatably mounted in a ring or a sleeve which surrounds the spindle. Two or more drive rollers increase the load-bearing capacity, two drive rollers arranged opposite one another or more than two drive rollers avoid a tilting moment, and three drive rollers make statically determined support possible. The drive rollers can be arranged distributed uniformly or non-uniformly over the circumference.

In addition to said drive roller, which serves for translatory driving, the disclosure provides at least three centering rollers, which are arranged distributed uniformly or non-uniformly over the circumference and roll on an outer circumference of the tube or the coil. The centering rollers guide a spindle nut coaxially on the spindle or guide the spindle coaxially in the spindle nut.

One configuration of the disclosure provides a metal bellows, which serves as an axial spring and as means for securing against rotation for the roller screw drive. On account of its elasticity in the axial direction, a metal bellows is suitable as an axial spring, to be precise as a tension spring and/or compression spring. In addition, a metal bellows is sufficiently torsionally rigid to serve as means for securing against rotation. One end of the metal bellows is held fixed in position and against rotation and the other end of the metal bellows is fitted fixed axially and against rotation on the moving part of the spindle drive, i.e. either on the spindle or on the spindle nut.

The disclosure further relates to an electromechanical brake booster comprising a roller screw drive of the type explained above, and also relates to a steering gear for an electromechanical power steering system comprising a spindle drive of the type explained above. Since, in the case of a steering gear, means for securing against rotation are provided, for example, by a rack and pinion gear and axial resilience is not required, if not disruptive, a metal bellows is not provided for this use of the disclosure, if not ruled out in principle. An electromechanical brake booster has an electric motor for driving the roller screw drive. Here, it is necessary to secure against rotation, and therefore the metal bellows as an axial spring and as means for securing against rotation is advantageous. The metal bellows can additionally act as an energy store which absorbs energy upon release of a vehicle braking system (the metal bellows is tensioned) and emits it when the brakes are operated.

BRIEF DESCRIPTION OF THE DRAWINGS

The disclosure will be explained in more detail herein with reference to exemplary embodiments illustrated in the drawings, in which:

FIG. 1 shows a semi-finished product of a spindle produced according to the disclosure in an axial section;

FIG. 2A shows half of a two-part mold for producing the spindle in accordance with the disclosure;

FIG. 2B shows half of a two-part mold, which has been modified as compared with FIG. 2A, for producing the spindle in accordance with the disclosure;

FIG. 3 shows the spindle produced according to the disclosure;

FIG. 5 shows the use of the spindle shown in FIG. 3 in a steering gear of an electromechanical power steering system according to the disclosure.

Figure 4:
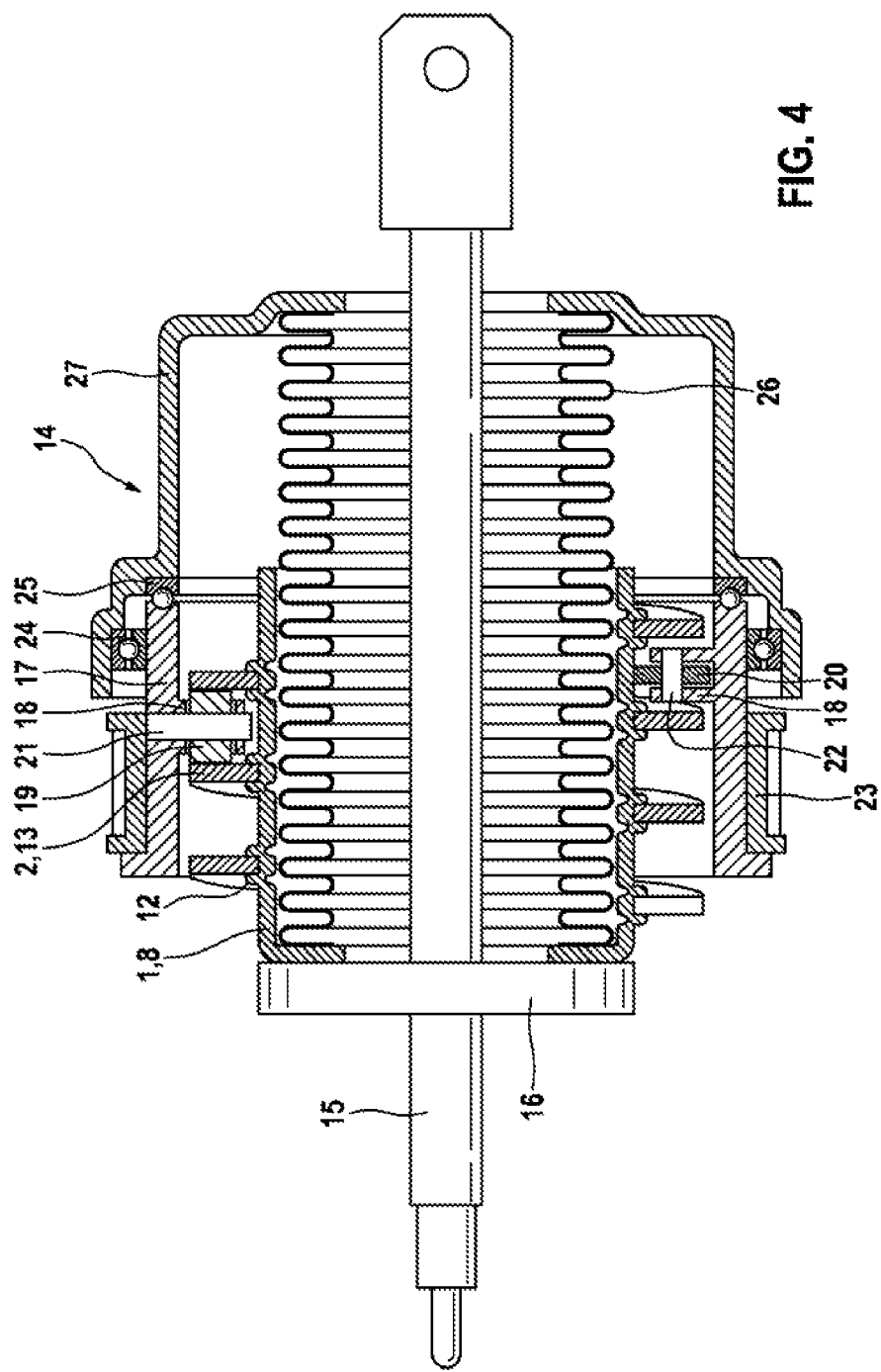
FIG. 4 shows the use of the spindle shown in FIG. 3 in a gear of an electromechanical brake booster according to the disclosure.

The drawing is to be understood as a simplified and schematic illustration for understanding and for explaining the disclosure. Further features of the disclosure become apparent from the following description of embodiments of the disclosure in conjunction with the claims, the preceding description and the drawing. The individual features can be implemented individually or in groups in any desired combination in embodiments of the disclosure.

DETAILED DESCRIPTION

To produce a spindle 1 in accordance with the disclosure, a spring wire with a round wire cross section is rolled to form a flat wire with a rectangular wire cross section and bent to form a coil 2, such that long sides of the wire cross section run radially. The spring wire is strengthened by the rolling and can be hardened. A number of such coils are inserted into a half 3 of a mold 4 coaxially one behind another, as shown in FIG. 2A. The mold 4 is reminiscent of an injection mold or a die-casting mold. The mold 4 has a cylindrical cavity 5 with helical grooves 6 for receiving the coils 2. A diameter of the cylindrical part of the cavity 5 corresponds to an inner diameter of the coils 2. The mold 4 is split in an axial plane. The mold 4 can have two parts, as shown, or more (than two) parts. The cavity 5 is open at both ends.

A tube 8, the outer diameter of which corresponds to the inner diameter of the coils 2 and therefore to the diameter of the cylindrical part of the cavity 5, is pushed axially into the cavity 5 and into the coils 2 which have been inserted into the mold 4. The mold 4 is closed with a second mold half (not shown), which continues the grooves 6 of that half 3 of the mold 4 which is shown. The tube 8, which does not protrude from the mold 4, is closed in a pressure-resistant and tight manner at both ends with closure pieces 7 and subjected to pressure oil from the inside. The pressurization is illustrated symbolically by a hydraulic pump 9 and a manometer 10. The tube 8 has to be closed in a pressure-tight manner such that it can be pressurized from the inside. Pressure which acts on the tube 8 from the outside and prevents or at least hinders the deformation of the tube 8 must not be built up in the mold 4. By the pressurization from the inside, the tube 8 is plastically deformed, and it rests against the coils 2, which are supported from the outside by the mold 4, from the inside. At flutes at the transition from the grooves 6 into the cylindrical part of the cavity 5, the mold 4 has channels 11 with a rounded cross section, which are open both toward the grooves 6 and toward the cylindrical part of the cavity 5. The tube 8 is deformed by the pressurization from the inside into the channels 11 of the mold 4; beads 12 form on both sides of the coils 2 in the root region thereof, i.e. at the transition from the coils 2 to the tube 8, as shown in FIG. 3. The coils 2 are fixed to the tube 8; in addition to the positive locking by the beads 12 in the axial direction and frictional locking, the coils 2 can be cold-welded to the tube 8 by the pressurization. The tube 8, together with the coils 2, forms the spindle 1, the threads 13 of which are formed by the coils 2. The deformation of the tube 8 and the integral formation from the inside on the coils 2 can also be referred to as hydroforming. The level of the pressure is dependent inter alia on the material and the wall thickness of the tube 8 and on the degree of deformation. The tube 8 is separated between the coils 2 such that a number of spindles 1 are formed. The tube 8 has thin walls as does the (hollow) spindle 1.

FIG. 2B shows a modified mold 4. It has no channels 11 at the transition from the grooves 6 to the cylindrical part of the cavity 5, but instead the grooves 6 are smaller than the width of a turn cross section of the coil 2 in the radial direction. That is to say, the turns of the coils 2 inserted into the grooves 6 of the mold 4 protrude inward into the cylindrical part of the cavity 5. To illustrate the protrusion of the turns of the coils 2 inward into the cylindrical part of the cavity 5, FIG. 2B shows, on the right-hand side, a coil 2 inserted into a groove 6 of the mold 4. The coil 2 is shown in an axial section, such that the inwardly protruding turn cross sections of the coil 2 can be seen as a hatched sectional plane. During deformation of the tube 8 by pressurization from the inside, the inward protrusion of the turns of the coils 2 in the mold 4 has the effect that the tube 8 is not only integrally formed on the coils 2 from the inside, but instead encompasses the coils 2 laterally somewhat. This brings about a positive lock between the coils 2 and the tube 8 in the axial direction, as with the mold 8 shown in FIG. 2A.

To increase the accuracy and/or surface quality, flat sides of the coil 2, which forms the thread 13, can be machined by grinding, for example. If only one flat side of the thread 13 is acted upon, it is sufficient to machine only this one flat side.

In a departure from the embodiment illustrated, the coils 2 can have a pitch which varies over its length, as a result of which a spindle 1 with a varying thread pitch can be produced. To produce a threaded spindle with two turns, in each case two coils 2 are arranged axially offset in relation to one another preferably by half a pitch. It is accordingly also possible to produce a spindle 1 having more than two threads. It is also possible to form the coil 2 with a depression, i.e. a corrugation, in order to bring about stable positioning of a spindle nut, which is still to be explained.

FIG. 4 shows the use of a spindle 1 produced by the method explained above with reference to FIGS. 1 to 3 in a roller screw drive 14 of an electromechanical brake booster, which for the rest is not shown. The tube 8 of the spindle 1, which has been cut to length, is deformed so as to protrude radially inward at one end, with a central hole remaining for the passage of a pedal rod 15. The inwardly deformed end of the tube 8 rests against a cylindrical pressure disk 16 of the pedal rod 15. The pedal rod 15 connects a foot-operated brake pedal (not shown) to a thrust rod piston (likewise not shown) of a master brake cylinder of a hydraulic vehicle braking system in an articulated manner. A spindle nut 17 coaxially encompasses the spindle 1. The spindle nut 17 is shaped like a cylindrical tube and is shorter than the spindle 1. It has an inwardly protruding, helically circumferential web 18, which has the same pitch as the coil 2 which forms the thread 13 of the spindle 1. The web 18 extends approximately over 360° and engages between turns of the thread 13.

The web 18 has recesses for drive rollers 19 and centering rollers 20, which are rotatably mounted on cylindrical pins which form axles 21, 22 of the drive rollers 19 and of the centering rollers 20. Three drive rollers 19 are arranged distributed equidistantly over the circumference, have radial axles 21 and roll on a flat side of the coils 2 which form the thread 13. Three drive rollers 19 arranged distributed over the circumference achieve statically determined support of the spindle nut 17 on the spindle 1 and, conversely, of the spindle 1 in the spindle nut 17.

Three further centering rollers 20 are arranged between the above-mentioned drive rollers 19 and have axles 22 orthogonal to the coil 2. The centering rollers 20 roll in the intermediate space between the thread 13 on the tube 8 of the spindle 1. These three centering rollers center the spindle nut 17 on the spindle 1 and, conversely, the spindle 1 in the spindle nut 17.

A toothed belt pulley 23 is pressed onto the spindle nut 17 for rotary driving. The spindle nut 17 is rotatably mounted with a radial bearing 24 and with an axial bearing 25. In the exemplary embodiment, both bearings 24, 25 are ball bearings. The axial bearing 25 supports the spindle nut 17 in the axial direction. In the event that the spindle nut 17 is driven in rotation with a toothed belt (not shown) on the toothed belt pulley 23, the drive rollers 19 roll on the coil 2 which forms the thread 13 of the spindle 1. The spindle 1 is displaced axially and exerts an axial force via the pressure disk 16 onto the pedal rod 15. It is thereby possible for a muscle force which is exerted on the pedal rod 15 by the foot-operated brake pedal (not shown) for activating the master brake cylinder (not shown) to be reinforced.

A metal bellows 26 which surrounds the pedal rod 15 is arranged coaxially in the tube 8 of the spindle 1. The metal bellows 26 is supported at one end fixed axially and against rotation in a housing 27; the other end thereof is connected fixed axially and against rotation to the inwardly deformed end of the tube 8. The metal bellows 26 forms means for securing against rotation; it holds the spindle 1 fixed against rotation. In addition, the metal bellows 26 forms an axial spring which is tensioned and stores energy upon displacement of the spindle 8 or is relaxed and emits energy. The metal bellows 26 can be tensioned, when the master brake cylinder (not shown) is released, by rotary driving of the spindle nut 17, which is converted by the roller screw drive 14 into displacement of the spindle 1, and emits the energy stored in the process again when the brakes are operated. In this case, it is necessary to axially support the spindle nut 17 in both axial directions. A maximum torque and a maximum power of an electric motor (not shown) of the electromechanical brake booster are reduced as a result.

The housing 27 is produced for example by deep-drawing from sheet metal; it is shaped like a cylindrical tube with diameter steps. The bearings 24, 25 of the spindle nut 17 are accommodated on diameter steps of the housing 27.

FIG. 5 shows the use of the roller screw drive 14 according to the disclosure, which has already been described with reference to FIG. 4, in a steering gear of an electromechanical power steering system. The roller screw drive 14 shown in FIG. 5 has substantially the same design as the roller screw drive 14 shown in FIG. 4; the spindle 1 thereof is produced in the manner explained in relation to FIGS. 1 to 3, with reference being made to the corresponding statements made above. A toothed rack 28 is inserted and welded into one end of the tube 8 of the spindle 1 and a toothed wheel 29 which can be driven in rotation with a steering wheel (not shown) meshes with said toothed rack. A pressure piece 30 is arranged opposite the toothed wheel 29 and supports the toothed rack 28 and holds it in engagement with the toothed wheel 29. The toothed rack 28 is guided displaceably in the longitudinal direction thereof in the hollow round pressure piece; the engagement of the toothed wheel 29 in the toothed rack 28 holds the toothed rack 28 fixed against rotation. Since the toothed rack 28 is rigidly connected to the spindle 1 by being pressed into the tube 8 of the spindle 1, the spindle 1 does not require any dedicated means for securing against rotation; the metal bellows is therefore not shown in FIG. 5. A ball joint is fitted at an end of the toothed rack 28 which is remote from the spindle 1, and a ball joint is likewise fitted at an end of the tube 8 of the spindle 1 which is remote from the toothed rack 28, said ball joints connecting the toothed rack 28 and the spindle 1 to track rods of a steering system (not shown). The spindle nut 17, which has the same form in FIG. 5 as in FIG. 4 and acts in the same manner, is rotatably mounted with two axial bearings 25 and supported in both axial directions; it can thereby transmit forces in both directions. Depending on the direction of rotation of the spindle nut 17 and on the direction of displacement of the spindle 1, the drive rollers 19 with the radial axles 21 roll on both flat sides of the coil 2 which form the thread 13 of the spindle 1.

There is at best a very small play between the turns of the coil 2 and the drive rollers 19, and therefore at best a very small axial play of the spindle 1 in relation to the spindle nut 17. The roller screw drive 14 reinforces a steering force exerted by the toothed wheel 29 on the toothed rack 28.

With a modification of the method according to the disclosure, it is also possible to produce a spindle with an inner thread. To this end, the coil is arranged on a core which supports it during the hydroforming from the inside, and the tube is arranged on the coil on the outside, it also being possible for the order to be reversed. Then, the tube is pressurized from the outside and, as described per se, is integrally formed from the outside on the coil, such that the coil is held fixed axially and against rotation in the tube (not shown).

The invention claimed is:

1. A roller screw drive comprising:
    a spindle including at least one coil and a tube which is integrally formed on a root region of the at least one coil by hydroforming from the inside of the tube,
    wherein the roller screw drive has at least one drive roller which rolls on the coil,
    wherein the at least one drive roller is rotatably mounted in a ring which coaxially surrounds the spindle, and
    wherein the ring has at least three centering rollers, which are arranged distributed over the circumference thereof and roll on a circumference of the spindle.

2. The roller screw drive as claimed in claim 1, wherein the roller screw drive has three drive rollers.

3. The roller screw drive as claimed in claim 1, further comprising:
    a metal bellows configured as an axial spring that is configured to secure the roller screw drive against rotation.

4. The roller screw drive as claimed in claim 1, wherein:
    the roller screw drive is included in an electromechanical brake booster,
    the electromechanical brake booster further includes an electric motor, and
    the roller screw drive can be driven with the electric motor.

5. The roller screw drive as claimed in claim 1, wherein:
    the roller screw drive is included in a steering gear for an electromechanical power steering system, which further includes an electric motor for driving the steering gear,
    the roller screw drive is configured to be driven with the electric motor.

6. A roller screw drive comprising:
    a spindle including:
        at least one coil; and
        a tube which is integrally formed on a root region of the at least one coil by a hydroforming process, the tube having helically circumferential beads formed via the hydroforming process on each side of the coil in the root region; and
    at least one drive roller configured to roll on the coil, wherein:
    the at least one drive roller is rotatably mounted in a ring which coaxially surrounds the spindle, and
    the ring has at least three centering rollers, which are arranged distributed over the circumference thereof and roll on a circumference of the spindle.

7. The roller screw drive as claimed in claim 6, the tube further having a thin-walled structure.

8. The roller screw drive as claimed in claim 6, wherein the tube at least partially laterally encompasses the coil in order to form a positive locking relationship between the tube and the coil in an axial direction.

9. The roller screw drive as claimed in claim 6, wherein the roller screw drive has three drive rollers.

\* \* \* \* \*